US011142310B2

(12) United States Patent
Groninga et al.

(10) Patent No.: US 11,142,310 B2
(45) Date of Patent: Oct. 12, 2021

(54) DUAL TILTWING AIRCRAFT HAVING A QUADRILATERAL LINKAGE

(71) Applicant: Textron Innovations Inc., Providence, RI (US)

(72) Inventors: Kirk Landon Groninga, Keller, TX (US); Daniel Bryan Robertson, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 148 days.

(21) Appl. No.: 16/789,888

(22) Filed: Feb. 13, 2020

(65) Prior Publication Data
US 2020/0307781 A1 Oct. 1, 2020

Related U.S. Application Data

(63) Continuation of application No. 15/662,257, filed on Jul. 27, 2017, now Pat. No. 10,597,152.

(51) Int. Cl.
*B64C 29/00* (2006.01)
*B64C 39/00* (2006.01)
(Continued)

(52) U.S. Cl.
CPC ........ *B64C 29/0033* (2013.01); *B64C 39/008* (2013.01); *B64C 39/08* (2013.01); *B64D 27/24* (2013.01); *B64D 2027/026* (2013.01)

(58) Field of Classification Search
CPC .... B64C 39/08; B64C 39/008; B64C 29/0033
See application file for complete search history.

(56) References Cited

U.S. PATENT DOCUMENTS 6,138,943 A * 10/2000 Huang ............... B60F 5/02
244/17.25
8,616,492 B2 12/2013 Oliver
(Continued)

FOREIGN PATENT DOCUMENTS

AU 532184 B2 9/1983
CN 104401480 A 3/2015
(Continued)

OTHER PUBLICATIONS

Search Report, CNIPA, Application No. 201810843325.4, dated May 27, 2021.
(Continued)

*Primary Examiner* — Philip J Bonzell
*Assistant Examiner* — Tye William Abell
(74) *Attorney, Agent, or Firm* — Lawrence Youst PLLC (57) ABSTRACT

An aircraft having a vertical takeoff and landing flight mode and a forward flight mode. The aircraft includes a fuselage and a dual tiltwing assembly having a vertical lift orientation and a forward thrust orientation relative to the fuselage. The dual tiltwing assembly includes a forward wing and an aft wing coupled together and to the fuselage by a quadrilateral linkage. A distributed propulsion system is coupled to the dual tiltwing assembly and includes a plurality of forward propulsion assemblies coupled to the forward wing and a plurality of aft propulsion assemblies coupled to the aft wing. A flight control system is operably associated with the distributed propulsion system and the dual tiltwing assembly. The flight control system is operable to independently control each of the propulsion assemblies and is operable to transition the dual tiltwing assembly between the vertical lift orientation and the forward thrust orientation.

20 Claims, 9 Drawing Sheets

(51) Int. Cl.
  *B64C 39/08* (2006.01)
  *B64D 27/24* (2006.01)
  *B64D 27/02* (2006.01)

(56) References Cited

U.S. PATENT DOCUMENTS

| | | | |
|---|---|---|---|
| 8,820,672 | B2 | 9/2014 | Erben et al. |
| 8,909,391 | B1 | 12/2014 | Peeters et al. |
| 8,948,935 | B1 | 2/2015 | Peeters et al. |
| 9,087,451 | B1 | 7/2015 | Jarrell |
| 9,127,908 | B2 | 9/2015 | Miralles |
| 9,162,753 | B1 | 10/2015 | Panto et al. |
| 9,193,460 | B2 | 11/2015 | Laudrain |
| 9,221,538 | B2 | 12/2015 | Takahashi et al. |
| 9,284,049 | B1 | 3/2016 | Wang et al. |
| 9,321,530 | B2 | 4/2016 | Wang et al. |
| 9,403,593 | B2 | 8/2016 | Downey et al. |
| 9,463,875 | B2 | 10/2016 | Abuelsaad et al. |
| 9,475,579 | B2 | 10/2016 | Fredericks et al. |
| 2016/0244158 | A1* | 8/2016 | Fredericks .............. B64C 25/52 |
| 2018/0002026 | A1* | 1/2018 | Oldroyd ................. B64D 27/12 |
| 2018/0065739 | A1* | 3/2018 | Vondrell ............. B64C 29/0033 |
| 2018/0086448 | A1* | 3/2018 | Kroo ................... B64C 29/0033 |

FOREIGN PATENT DOCUMENTS

| | | |
|---|---|---|
| CN | 105564642 A | 5/2016 |
| CN | 205396534 U | 7/2016 |

OTHER PUBLICATIONS

Air Launched Unmanned Disaster Relief Delivery Vehicle, 33rd Annual AHS Student Design Competition, University of Maryland, Undated but admitted prior art.

European Exam Report, Application No. 18184104.0, European Patent Office, dated Oct. 25, 2018.

European Search Report, Application No. 18184104.0, European Patent Office, dated Sep. 5, 2018.

* cited by examiner

DUAL TILTWING AIRCRAFT HAVING A QUADRILATERAL LINKAGE

CROSS-REFERENCE TO RELATED APPLICATIONS

The present application is a continuation of co-pending application Ser. No. 15/662,257 filed Jul. 27, 2017.

TECHNICAL FIELD OF THE DISCLOSURE

The present disclosure relates, in general, to aircraft having a forward flight mode and a vertical takeoff and landing flight mode and, in particular, to a dual tiltwing aircraft using a quadrilateral linkage to couple the wings together for synchronized transitions between forward flight mode and vertical takeoff and landing flight mode.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor aircraft is another example of a VTOL aircraft. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, typically suffer from download inefficiencies during VTOL operations due to propwash interference with the fixed wing.

A further example of a VTOL aircraft is a tiltwing aircraft that features a rotatable wing that is generally horizontal for forward flight and rotates to a generally vertical orientation for vertical takeoff and landing. Propellers are coupled to the rotating wing to provide the required vertical lift for takeoff and landing and the required forward thrust to generate lift from the wing during forward flight. The tiltwing design enables the propwash generated by the propellers to travels generally in the chordwise direction of the wing, thereby impacting the wing on its smaller dimension and improving vertical lift efficiency as compared to tiltrotor aircraft. It has been found, however, that tiltwing aircraft may be difficult to control during hover and typically require an aft mounted thrust station to generate a pitch control moment during VTOL operations.

SUMMARY

In a first aspect, the present disclosure is directed to an aircraft having a vertical takeoff and landing flight mode and a forward flight mode. The aircraft includes a fuselage and a dual tiltwing assembly having a vertical lift orientation and a forward thrust orientation relative to the fuselage. The dual tiltwing assembly includes a forward wing, an aft wing and a quadrilateral linkage. The quadrilateral linkage couples the forward wing to the aft wing and the quadrilateral linkage couples the forward and aft wings to the fuselage. A distributed propulsion system is coupled to the dual tiltwing assembly. The distributed propulsion system includes a plurality of forward propulsion assemblies coupled to the forward wing and a plurality of aft propulsion assemblies coupled to the aft wing. A flight control system is operably associated with the distributed propulsion system and the dual tiltwing assembly. The flight control system is operable to independently control each of the propulsion assemblies and is operable to transition the dual tiltwing assembly between the vertical lift orientation and the forward thrust orientation.

In some embodiments, propwash generated by the forward propulsion assemblies may travel generally in the chordwise direction of the forward wing and propwash generated by the aft propulsion assemblies may travel generally in the chordwise direction of the aft wing in both the vertical lift orientation and the forward thrust orientation of the dual tiltwing assembly. In certain embodiments, the forward wing may maintain a substantially congruent angle of incidence with the aft wing during transitions between the vertical lift orientation and the forward thrust orientation of the dual tiltwing assembly. In some embodiments, the quadrilateral linkage may include a fixed link formed by the fuselage, an input link coupled between the fixed link and one of the forward and aft wings, a floating link coupled between the forward wing and the aft wing and an output link coupled between the fixed link and the other of the forward and aft wings. In such embodiments, a synchronizing link may be coupled between the forward wing and the aft wing to maintain the angle of incidence of the forward wing substantially congruent with the angle of incidence of the aft wing during transitions between the vertical lift orientation and the forward thrust orientation of the dual tiltwing assembly. Also, in such embodiments, a rotary actuator may be operably disposed between the flight control system and the input link to transition the dual tiltwing assembly between the vertical lift orientation and the forward thrust orientation.

In certain embodiments, the quadrilateral linkage may be a planar quadrilateral linkage. In some embodiments, the quadrilateral linkage may be a convex quadrilateral linkage. In certain embodiments, the quadrilateral linkage may be a non-Grashof quadrilateral linkage. In some embodiments, the quadrilateral linkage may include a fixed link formed by the fuselage, first and second input links coupled between the fixed link and one of the forward and aft wings, first and second floating links coupled between the forward wing and the aft wing and first and second output links coupled between the fixed link and the other of the forward and aft wings. In such embodiments, first and second synchronizing links may be coupled between the forward wing and the aft wing to maintain the angle of incidence of the forward wing substantially congruent with the angle of incidence of the aft wing during transitions between the vertical lift orientation and the forward thrust orientation of the dual tiltwing assembly.

In certain embodiments, each of the propulsion assemblies may include a nacelle operable to be coupled to one of the forward and aft wings, an electric motor disposed within the nacelle, a rotor hub mechanically coupled to the electric motor and operable to rotate responsive to operation of the electric motor and a proprotor mechanically coupled to the rotor hub and operable to rotate therewith. In some embodiments, an electrical energy source may be disposed within the fuselage to provide electrical energy to each of the propulsion assemblies. In certain embodiments, an electrical energy generation system may be disposed within the fuselage to provide electrical energy to each of the propulsion assemblies. In such embodiments, the electrical energy generation system may include at least one internal combustion engine and an electric generator. In some embodiments, the flight control system may command operation of the propulsion assemblies and/or the dual tiltwing assembly responsive to at least one of onboard pilot flight control, remote flight control, autonomous flight control and combinations thereof.

In a second aspect, the present disclosure is directed to an aircraft having a vertical takeoff and landing flight mode and a forward flight mode. The aircraft includes a fuselage and a dual tiltwing assembly having a vertical lift orientation and a forward thrust orientation relative to the fuselage. The dual tiltwing assembly includes a forward wing, an aft wing and a quadrilateral linkage. The quadrilateral linkage couples the forward wing to the aft wing and the quadrilateral linkage couples the forward and aft wings to the fuselage. A distributed propulsion system is coupled to the dual tiltwing assembly. The distributed propulsion system includes a plurality of forward propulsion assemblies coupled to the forward wing and a plurality of aft propulsion assemblies coupled to the aft wing. A flight control system is operably associated with the distributed propulsion system and the dual tiltwing assembly. The flight control system is operable to independently control each of the propulsion assemblies and is operable to transition the dual tiltwing assembly between the vertical lift orientation and the forward thrust orientation. The quadrilateral linkage includes a fixed link formed by the fuselage, an input link coupled between the fixed link and one of the forward and aft wings, a floating link and a synchronizing link coupled between the forward wing and the aft wing and an output link coupled between the fixed link and the other of the forward and aft wings. The synchronizing link maintains an angle of incidence of the forward wing substantially congruent with an angle of incidence of the aft wing during transitions between the vertical lift orientation and the forward thrust orientation of the dual tiltwing assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Referring to FIGS. 1A-1H in the drawings, various views of an aircraft 10 having a dual tiltwing assembly are depicted. In the illustrated embodiment, aircraft 10 has a fuselage 12 depicted as including a cabin for a pilot, passengers and/or cargo. Extending aft of fuselage 12 is a tailboom 14 that supports an empennage 16 depicted as a T tail having horizontal and vertical stabilizers that may include one or more elevators and rudders to aid in pitch and yaw stability during forward flight of aircraft 10. In other embodiments, empennage 16 may be a V tail, a conventional tail, a cruciform tail, a dual tail, a triple tail or have other suitable tail design.

Aircraft 10 includes a dual tiltwing assembly 18 that is operable to transition between a vertical lift orientation, as best seen in FIGS. 1A, 1C, 1E, 1G, and a forward thrust orientation, as best seen in FIGS. 1B, 1D, 1F, 1H. Dual tiltwing assembly 18 includes a forward wing 20 and an aft wing 22, each of which has an airfoil cross-section that generates lift responsive to the forward airspeed of aircraft 10. In the illustrated embodiment, forward wing 20 includes winglets 20a, 20b and aft wing 22 includes winglets 22a, 22b that reduce the wing tip vortex during forward flight to decrease the associated drag, increase lift and increase the range of aircraft 10. Forward wing 20 and aft wing 22 are preferably formed from high strength and lightweight materials such as fiberglass fabric, carbon fabric, fiberglass tape, carbon tape and combinations thereof that may be formed by curing together a plurality of material layers. Forward wing 20 and aft wing 22 preferably include internal passageways operable to contain communication lines such as electrical cables, data cables and the like. Forward wing 20 and aft wing 22 may include one or more ailerons that can be used to generate and control roll during forward flight of an aircraft 10.

In the illustrated embodiment, a distributed propulsion system is coupled to dual tiltwing assembly 18. The distributed propulsion system includes a plurality of propulsion assemblies 24 that may be permanently mounted or independently attachable to and detachable from dual tiltwing assembly 18. As illustrated, the distributed propulsion system includes twelve independently operating propulsion assemblies 24. In other embodiments, however, the distributed propulsion system of aircraft 10 could have other numbers of independent propulsion assemblies including four, eight, sixteen or other suitable number of independent propulsion assemblies 24. The propulsion assemblies 24 of forward wing 20 may be referred to as forward propulsion assemblies and the propulsion assemblies 24 of aft wing 22 may be referred to as aft propulsion assemblies. In the illustrated embodiment, propulsion assemblies 24 are positioned in a mid wing configuration. In other embodiments, propulsion assemblies 24 could be positioned in a high wing configuration, a low wing configuration or suitable combination thereof such as forward propulsion assemblies being positioned in a low wing configuration and aft propulsion assemblies being positioned in a high wing configuration.

As discussed herein, each propulsion assembly 24 is independently controllable such that operational changes of certain propulsion assemblies 24 within the distributed propulsion system enable pitch, yaw and roll control of aircraft 10 during VTOL operations. For example, by changing the thrust output of at least some of the aft propulsion assemblies 24 relative to at least some of the forward propulsion assemblies 24, pitch control is achieved. As another example, by changing the thrust output of at least some of the propulsion assemblies 24 on the right side of aircraft 10 relative to at least some of the propulsion assemblies 24 on the right side of aircraft 10, roll control is achieved. Changing the thrust output of a propulsion assembly 24 may be accomplished by changing the rotational speed of the associated proprotor blades and/or changing the pitch of the associated proprotor blades. Yaw control of aircraft 10 is achieved by changing the torque output of at least some of the propulsion assemblies 24 having proprotor blades rotating in the clockwise direction relative to at least some of the propulsion assemblies 24 having proprotor blades rotating in the counterclockwise direction. In the illustrated embodiment, the forward propulsion assemblies 24 rotate in a clockwise direction and the aft propulsion assemblies 24 rotate in a counterclockwise direction when viewed from above in FIG. 1G. In addition to yaw control, this configuration provides torque balance to aircraft 10. In other embodiments, propulsion assembly 24 may rotate in other configurations.

Propulsion assemblies 24 may preferably be standardized and interchangeable units that are most preferably line replaceable units enabling easy installation and removal from dual tiltwing assembly 18. In addition, the use of line replaceable units is beneficial in maintenance situations if a fault is discovered with one of the propulsion assemblies. In this case, the faulty propulsion assembly can be decoupled from dual tiltwing assembly 18 by simple operations such as unbolting structural members, disconnecting communication lines and other suitable procedures. Another propulsion assembly can then be attached to dual tiltwing assembly 18 by coupling communication lines, bolting structural members together and other suitable procedures.

Figure 2:
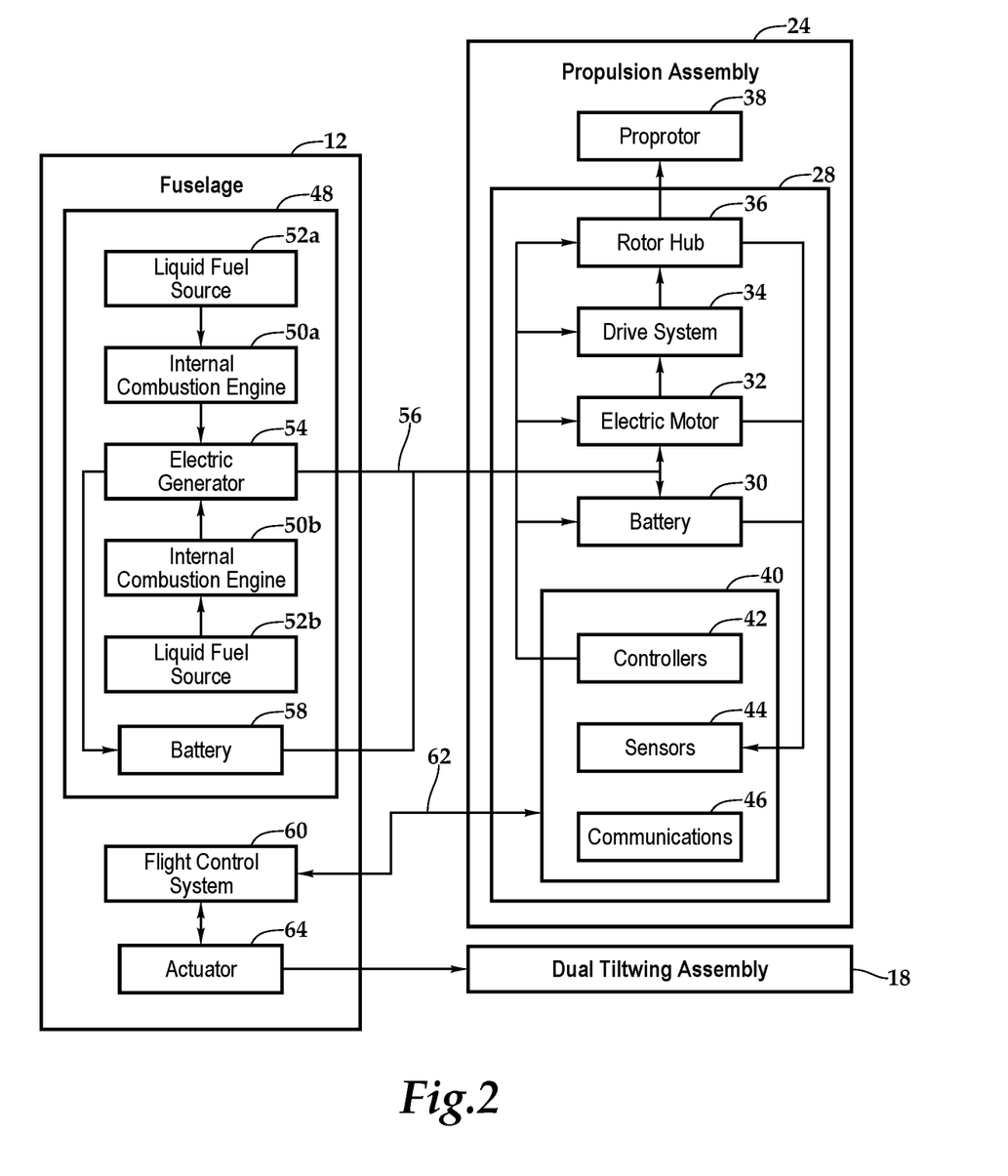
FIG. 2 is block diagram of a propulsion and control system for a dual tiltwing aircraft in accordance with embodiments of the present disclosure.

As best seen in FIG. 2, each propulsion assembly 24 includes a nacelle 28 that houses one or more batteries 30, an electric motor 32, a drive system 34, a rotor hub 36 and an electronics node 40 including, for example, controllers 42, sensors 44 and communications elements 46 as well as other components suitable for use in the operation of a propulsion assembly. Each propulsion assembly 24 also includes a proprotor 38 having a plurality of proprotor blades that are securably attached to rotor hub 36. The proprotor blades may have a fixed pitch or may be operable for pitch changes including, for example, collective and/or cyclic pitch changes. In addition, each propulsion assembly 24 may be operable for independent thrust vectoring by, for example, tilting the plane of rotation of the respective proprotor 38.

In the illustrated embodiment, aircraft 10 has an electrical energy source depicted as a liquid fuel based electrical energy generation system 48 that is housed within fuselage 12. Electrical energy generation system 48 preferably includes redundant internal combustion engines depicted as internal combustion engines 50a, 50b. Electrical energy generation system 48 also includes one or more fuel tanks depicted as liquid fuel sources 52a, 52b. In operation, one or both of internal combustion engines 50a, 50b are used to drive an electric generator 54 to produce electrical energy. This electrical energy is feed to propulsion assemblies 24 via communication lines 56 within dual tiltwing assembly 18 to directly power electric motors 32 and/or for storage within batteries 30. This type of hybrid power system is beneficial as the energy density of liquid fuel exceeds that of batteries enabling greater endurance for aircraft 10.

Alternatively or additionally, fuselage 12 may house one or more batteries 58 that may serve as the electrical energy source for propulsion assemblies 24. The fuselage mounted batteries 58 may be charged by electrical energy generation system 48 and/or may be charged at a ground based station. Batteries 58 may also be interchangeably removed and installed to enable efficient refueling in embodiments of aircraft 10 wherein the electrical energy source is battery based. In embodiments having both batteries 58 and electrical energy generation system 48, batteries 58 may provide a backup electrical power source to enable aircraft 10 to safely land in the event of a failure in electrical energy generation system 48. As another alternative, propulsion assemblies 24 may include hydraulic motors operated within a common hydraulic fluid system wherein one or more high pressure hydraulic sources or generators are housed within fuselage 12 to provide power to each of the hydraulic motors.

In the illustrated embodiment, aircraft 10 has a flight control system 60 that is housed within fuselage 12. Flight control system 60, such as a digital flight control system, is preferably a redundant flight control system and more preferably a triply redundant flight control system including three independent flight control computers. Use of triply redundant flight control system 60 improves the overall safety and reliability of aircraft 10 in the event of a failure in flight control system 60. Flight control system 60 preferably includes non-transitory computer readable storage media including a set of computer instructions executable by one or more processors for controlling the operation of the distributed propulsion system. Flight control system 60 may be implemented on one or more general-purpose computers, special purpose computers or other machines with memory and processing capability. For example, flight control system 60 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 60 may be a microprocessor-based system operable to execute program code in the form of machine-executable instructions. In addition, flight control system 60 may be selectively connectable to other computer systems via a proprietary encrypted network, a public encrypted network, the Internet or other suitable communication network that may include both wired and wireless connections.

Flight control system 60 communicates via a wired and/or wireless communications network 62 with electronics node 40 of each propulsion assembly 24. Flight control system 60 receives sensor data from and sends flight command information to electronics nodes 40 such that each propulsion assembly 24 may be individually and independently controlled and operated. In addition, flight control system 60 communicates with the actuation system of dual tiltwing assembly 18, such as a single rotary actuator 64 disposed with fuselage 12 that is operable to transition dual tiltwing assembly 18 between the vertical lift orientation and the forward thrust orientation. In both manned and unmanned missions, flight control system 60 may autonomously control some or all aspects of flight operation for aircraft 10. Flight control system 60 may also be operable to communicate with one or more remote systems, via a wireless communications protocol. The remote systems may be operable to receive flight data from and provide commands to flight control system 60 to enable remote flight control over some or all aspects of flight operation for aircraft 10, in both manned and unmanned missions. In manned missions, a pilot within aircraft 10 may receive flight data from and provide commands to flight control system 60 to enable onboard pilot control over some or all aspects of flight operation for aircraft 10. In particular, transitions of dual tiltwing assembly 18 between the vertical lift orientation and the forward thrust orientation may be accomplished responsive to onboard pilot flight control, remote flight control, autonomous flight control and combinations thereof.

Figure 1A:
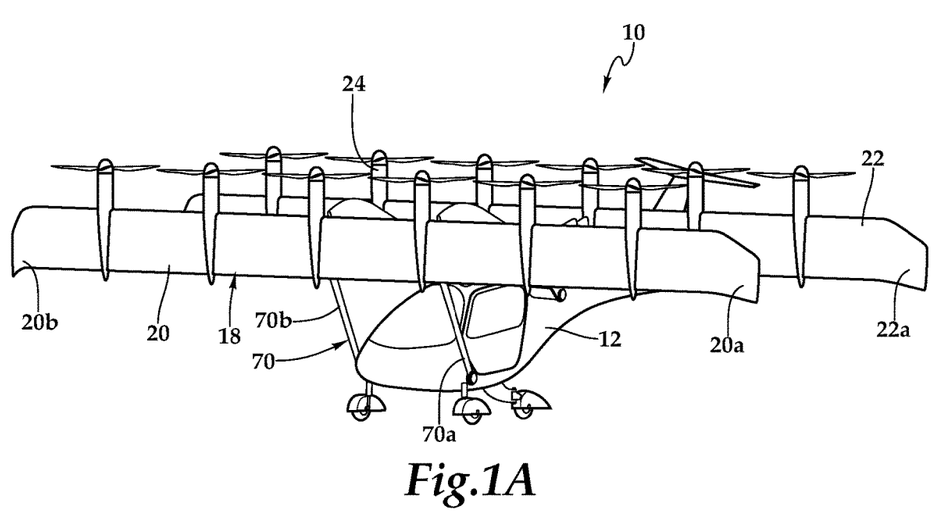
FIGS. 1A-1H are schematic illustrations of a dual tiltwing aircraft in accordance with embodiments of the present disclosure.
Figure 1B:
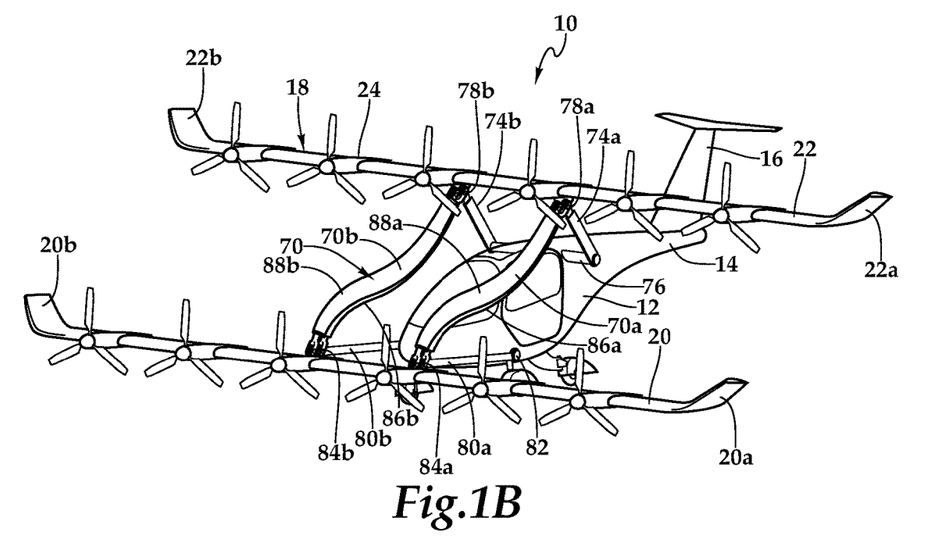
Figure 1C:
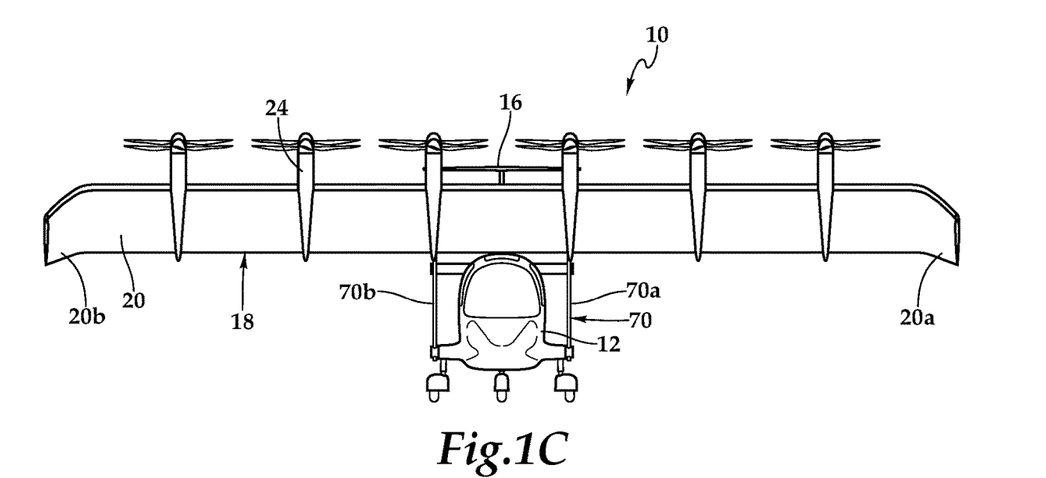
Figure 1D:
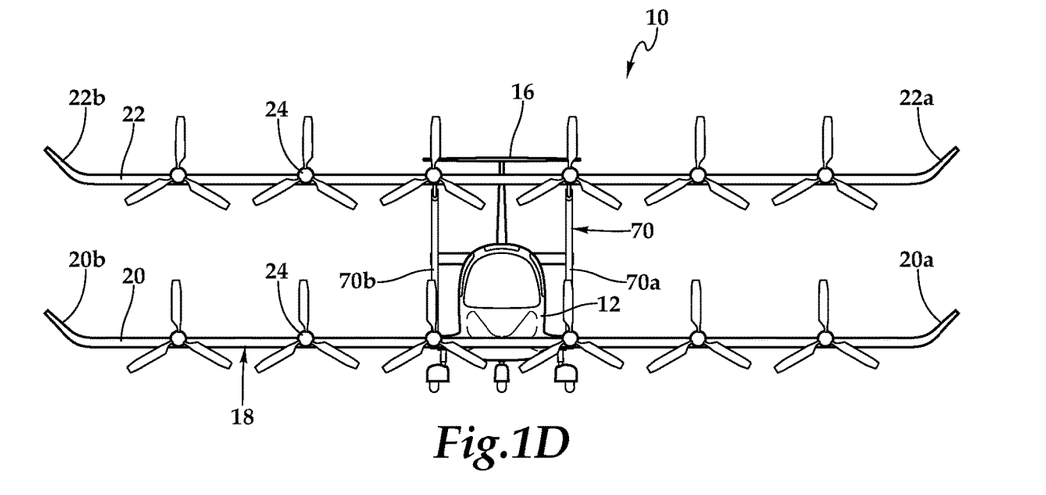

As best seen in FIGS. 1A, 1C, 1E, 1G, aircraft 10 has a vertical takeoff and landing flight mode wherein dual tiltwing assembly 18 is in its vertical lift orientation with forward wing 20 and aft wing 22 each having a generally vertical orientation taking into account the attitude of aircraft 10. Flight control system 60 independently controls and operates each propulsion assembly 24 to generate lift as well as provide pitch, yaw and roll control. In the illustrated configuration, the downward propwash generated by forward propulsion assemblies 24 travels generally in the chordwise direction of forward wing 20 and the downward propwash generated by aft propulsion assemblies 24 travels generally in the chordwise direction of aft wing 22. In addition, as best seen in FIG. 1C, the outboard positions of propulsion assemblies 24 relative to fuselage 12 minimize the propwash download on fuselage 12. Together, these features improve the lift efficiency of aircraft 10.

As best seen in FIGS. 1B, 1D, 1F, 1H, aircraft 10 has a forward flight mode wherein dual tiltwing assembly 18 is in its forward thrust orientation with forward wing 20 and aft wing 22 each having a generally horizontal orientation taking into account the attitude of aircraft 10. Flight control system 60 independently controls and operates each propulsion assembly 24 to generate the required thrust with forward wing 20 and aft wing 22 providing lift and with aerodynamic surfaces such elevators, rudders and ailerons providing pitch, yaw and roll control. In the illustrated configuration, the aftward propwash generated by forward propulsion assemblies 24 travels generally in the chordwise direction of forward wing 20 and the aftward propwash generated by aft propulsion assemblies 24 travels generally in the chordwise direction of aft wing 22. As the thrust requirements in forward flight mode are reduced compared to the thrust requirements of vertical takeoff and landing flight mode, during forward flight, flight control system 60 may reduce the rotational speeds of some or all of propulsion assemblies 24. Alternatively or additionally, flight control system 60 may shut down certain of the propulsion assemblies 24 during forward flight, in which case the associated proprotor blades may be allowed to windmill, may be locked against rotation or may be folded and locked.

Figure 1E:
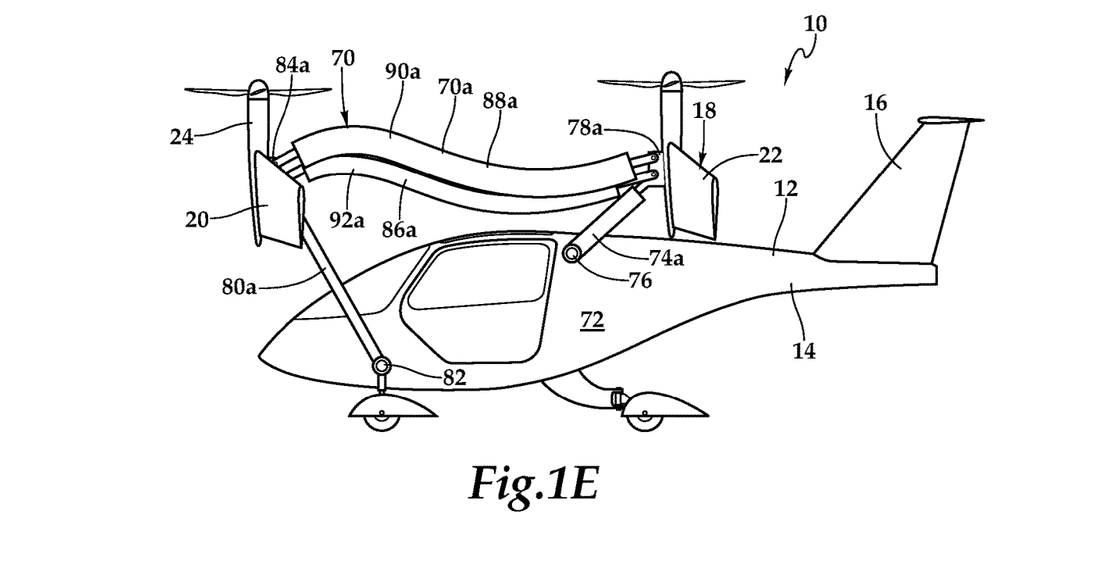
Figure 1F:
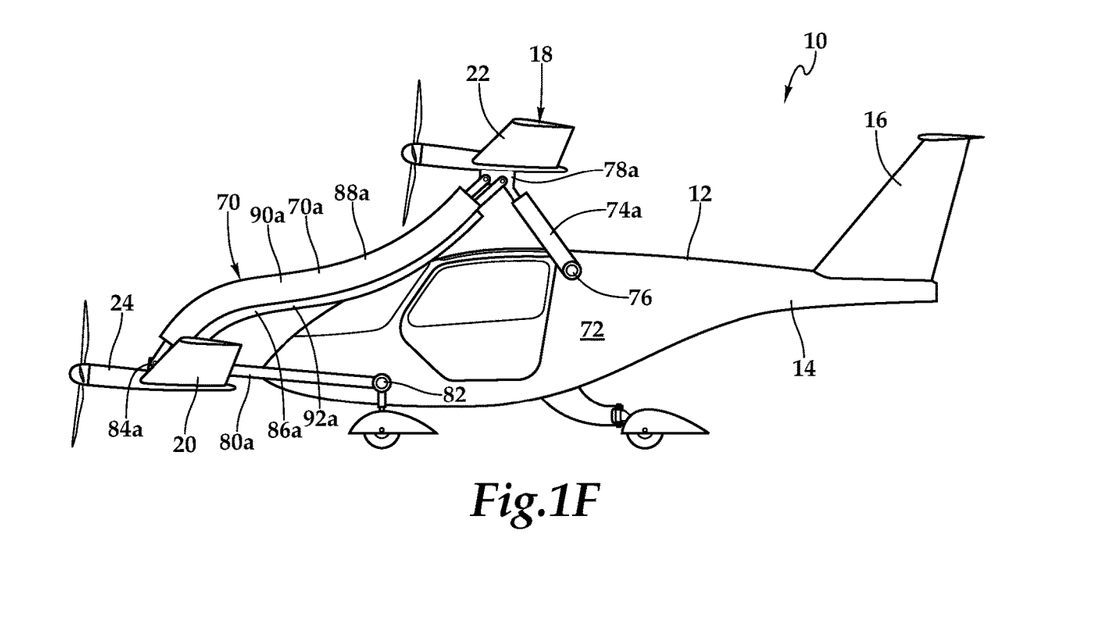
Figure 1G:
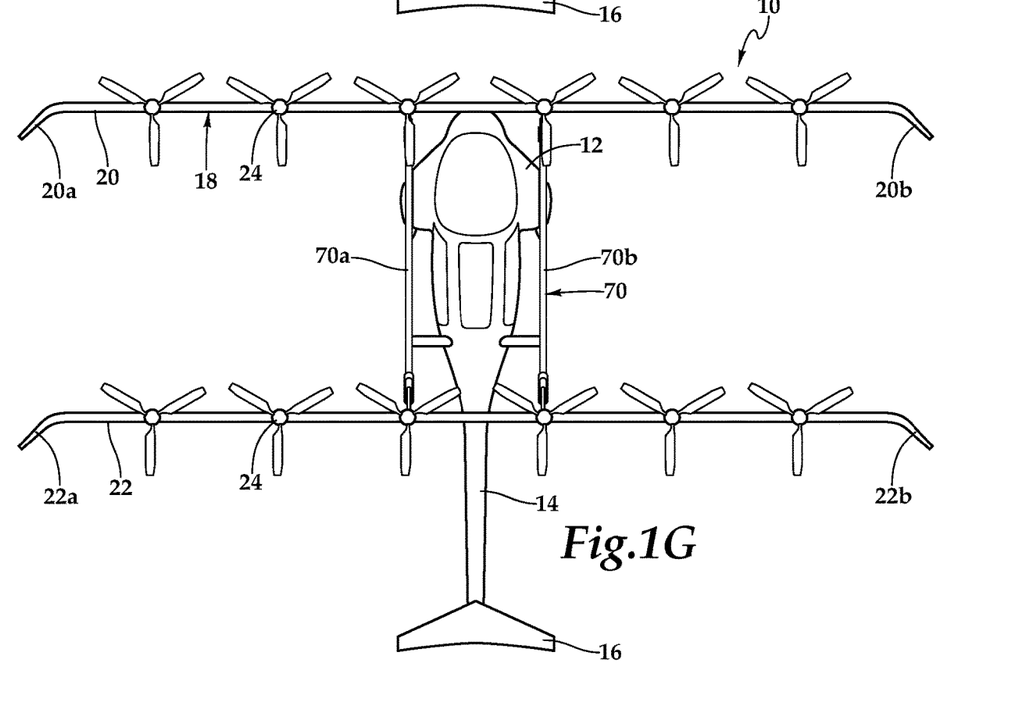
Figure 1H:
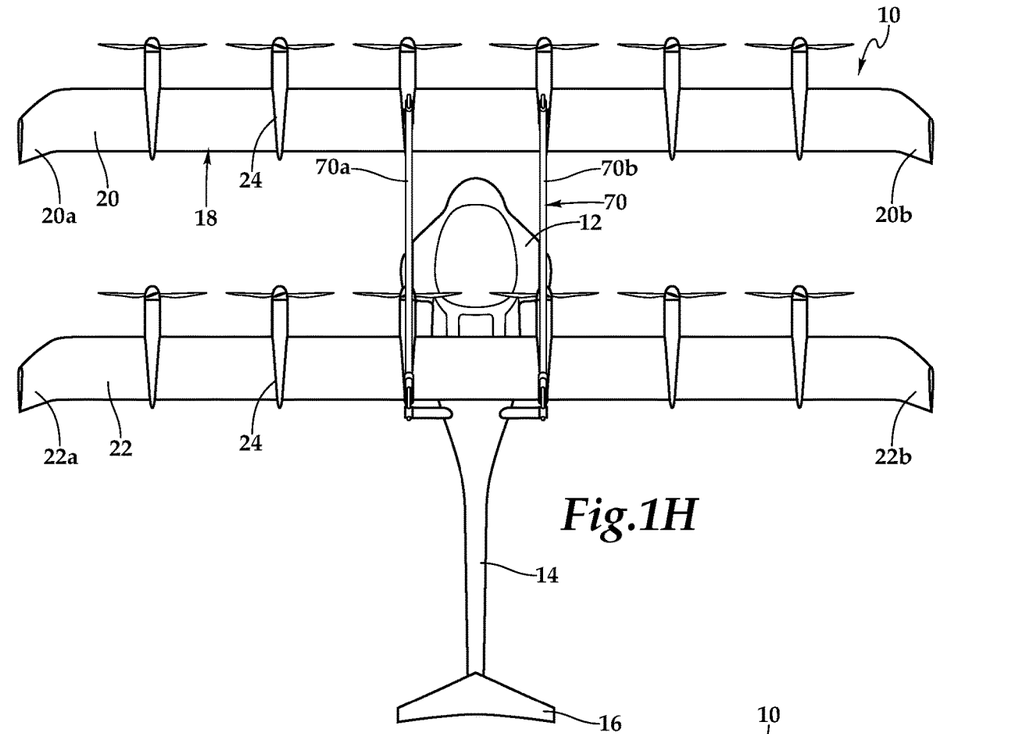

Dual tiltwing assembly 18 includes a quadrilateral linkage 70 that couples together forward wing 20 to aft wing 22 and also couples forward wing 20 and aft wing 22 to fuselage 12. As best seen in FIG. 1B, quadrilateral linkage 70 includes two set of oppositely disposed quadrilateral linkage sections 70a, 70b. Quadrilateral linkage section 70a is substantially similar to quadrilateral linkage section 70b therefore, for sake of efficiency, certain features will be disclosed only with regard to quadrilateral linkage section 70a. One having ordinary skill in the art, however, will fully appreciate an understanding of quadrilateral linkage section 70b based upon the disclosure herein of quadrilateral linkage section 70a. As best seen in FIGS. 1E-1F, quadrilateral linkage section 70a includes a fixed link 72 formed by fuselage 12. In the illustrated embodiment, quadrilateral linkage section 70a includes an input link 74a coupled between fixed link 72 and aft wing 22. Input link 74a is operably coupled to a rotatable shaft 76 that preferably extend through fuselage 12 and couples input link 74a to input link 74b of quadrilateral linkage section 70b, as best seen in FIG. 1B. Shaft 76 is coupled to actuator 64 to enable transitions of dual tiltwing assembly 18 between the vertical lift orientation and the forward thrust orientation. Input link 74a has a fixed relationship with aft wing 22 and is coupled thereto with bracket 78a.

In the illustrated embodiment, quadrilateral linkage section 70a includes an output link 80a coupled between fixed link 72 and forward wing 20. Output link 80a has a rotational relationship with forward wing 20 and is coupled thereto with bracket 84a. In the illustrated embodiment, output link 80a is operably coupled to a rotatable shaft 82 that preferably extends through fuselage 12 and couples output link 80a to output link 80b of quadrilateral linkage section 70b. In other embodiments, output link 80a and output link 80b may have independent revolute joints at fixed link 72. Quadrilateral linkage section 70a also includes a floating link 86a coupled between forward wing 20 and aft wing 22. Floating link 86a has a rotational relationship with aft wing 22 and input link 74a at bracket 78a. Likewise, floating link 86a has a rotational relationship with forward wing 20 and output link 80a at bracket 84a. In other embodiments, an input link could be coupled between the fixed link and the forward wing and an output link could be coupled between the fixed link and the aft wing.

Together, fixed link 72, input link 74a, output link 80a and floating link 86a form a movable closed chain linkage consisting of four links connected in a loop by four joints. In the illustrated embodiment, as each of the joints is a revolute joint, quadrilateral linkage section 70a may be considered a planar quadrilateral linkage. Also, in the illustrated embodiment, as the internal angle between adjacent links in quadrilateral linkage section 70a is always less than 180 degrees, adjacent links do not cross over each other and the length of one diagonal of quadrilateral linkage section 70a increases only when the length of the other diagonal of quadrilateral linkage section 70a decreases, quadrilateral linkage section 70a may be considered a convex quadrilateral linkage. Further, in the illustrated embodiment, as the sum of the lengths of the shortest link, input link 74a, and longest link, floating link 86a, is greater than the sum of the lengths of the remaining two links, fixed link 72 and output link 80a, the Grashof condition is not met thus, the shortest link is not able to rotate fully with respect to a neighboring link and quadrilateral linkage section 70a may be considered a non-Grashof quadrilateral linkage. In other embodiments, the fixed link, the input link, the output link and/or the floating link could have other configurations forming other closed chain linkages including other quadrilateral linkages with different properties.

In the illustrated embodiment, quadrilateral linkage section 70a includes a synchronizing link 88a that is coupled between forward wing 20 and aft wing 22. Synchronizing link 88a is positioned generally forward and above floating link 86a. Synchronizing link 88a has a rotational relationship with forward wing 20 at bracket 84a and a rotational relationship with aft wing 22 at bracket 78a. In the illustrated embodiment, synchronizing link 88a maintains the angle of incidence of forward wing 20 substantially congruent with the angle of incidence of aft wing 22 during transitions between the vertical lift orientation and the forward thrust orientation of dual tiltwing assembly 18, which may be referred to as wing synchronization Sustaining congruent angles of incidence for forward wing 20 and aft wing 22 may be beneficial to aircraft 10 in maintaining aerodynamic stability during transitions between the vertical lift orientation and the forward thrust orientation of dual tiltwing assembly 18. Preferably, synchronizing link 88a has an outer housing 90a and floating link 86a has an outer housing 92a that nest together to form a generally airfoil shaped assembly. Outer housing 90a and outer housing 92 are operable to suitably translate relative to one another during transitions between the vertical lift orientation and the forward thrust orientation of dual tiltwing assembly 18. The airfoil shaped assembly of outer housing 90a and outer housing 92a is particularly beneficial during forward flight of aircraft 10.

Figure 3A:
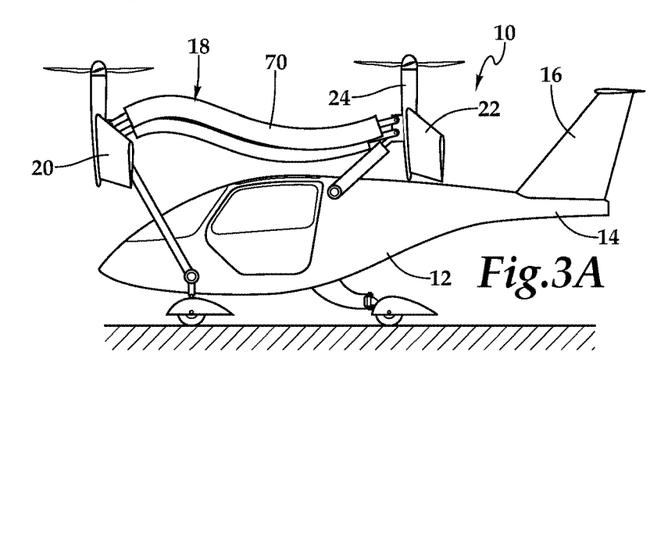
FIGS. 3A-3I are schematic illustrations of a dual tiltwing aircraft in a sequential flight operating scenario in accordance with embodiments of the present disclosure.

Referring next to FIGS. 3A-3I in the drawings, a sequential flight-operating scenario of aircraft 10 is depicted. As best seen in FIG. 3A, aircraft 10 is positioned on a surface at a current location such as at airport, in a military theater, on the flight deck of an aircraft carrier or other location. Dual tiltwing assembly 18 is in the vertical lift orientation with all propulsion assemblies 24 operating. Aircraft 10 may be operating responsive to autonomous flight control, remote flight control, onboard pilot flight control or any combination thereof. For example, it may be desirable to utilize onboard pilot flight control during certain maneuvers such as takeoff and landing but rely on remote or autonomous flight control during hover, forward flight and/or transitions between forward flight and VTOL operations.

Figures 3B, 3C:
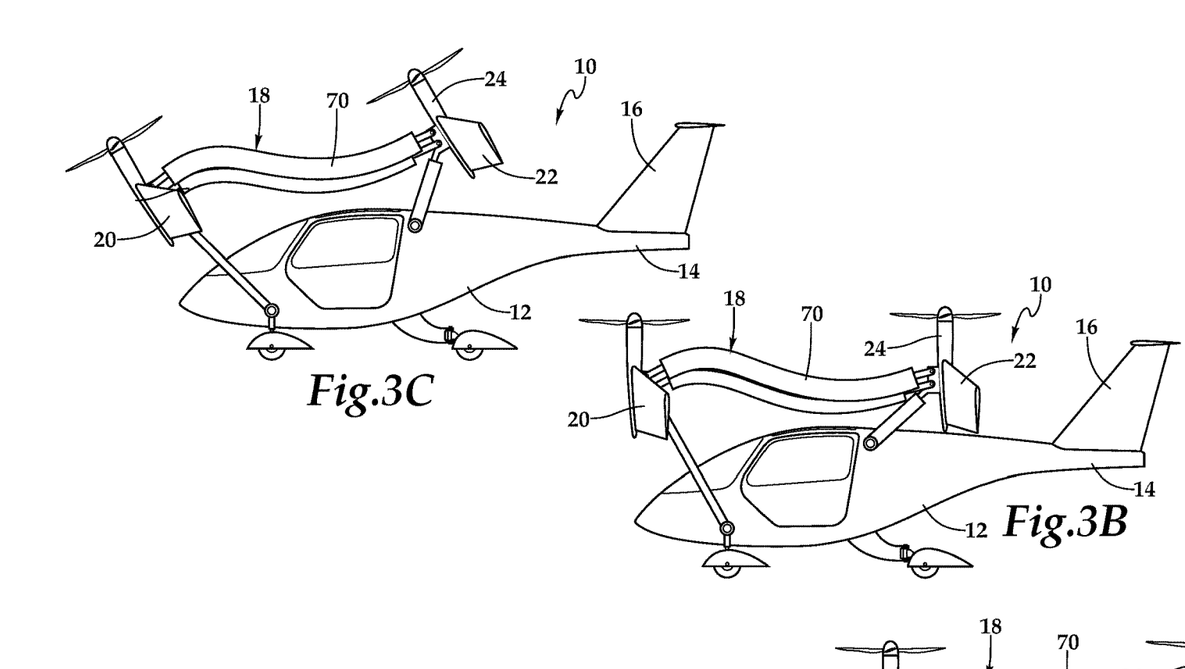
Figure 3D:
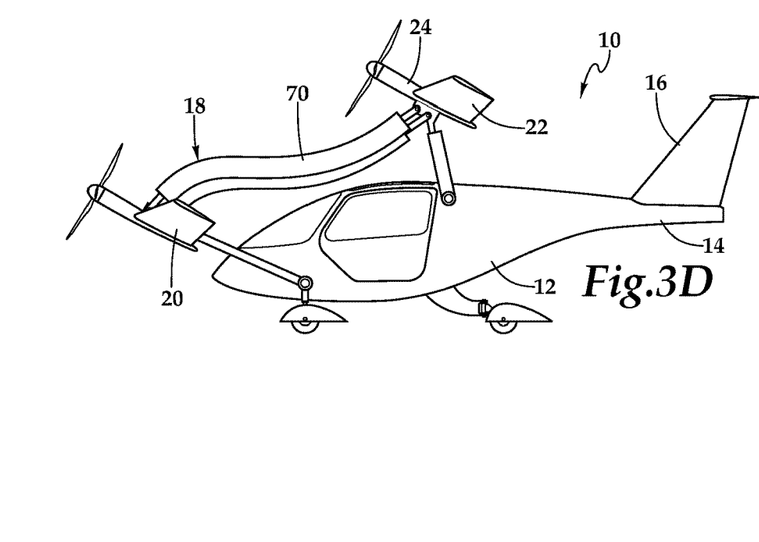
Figures 3E, 3F:
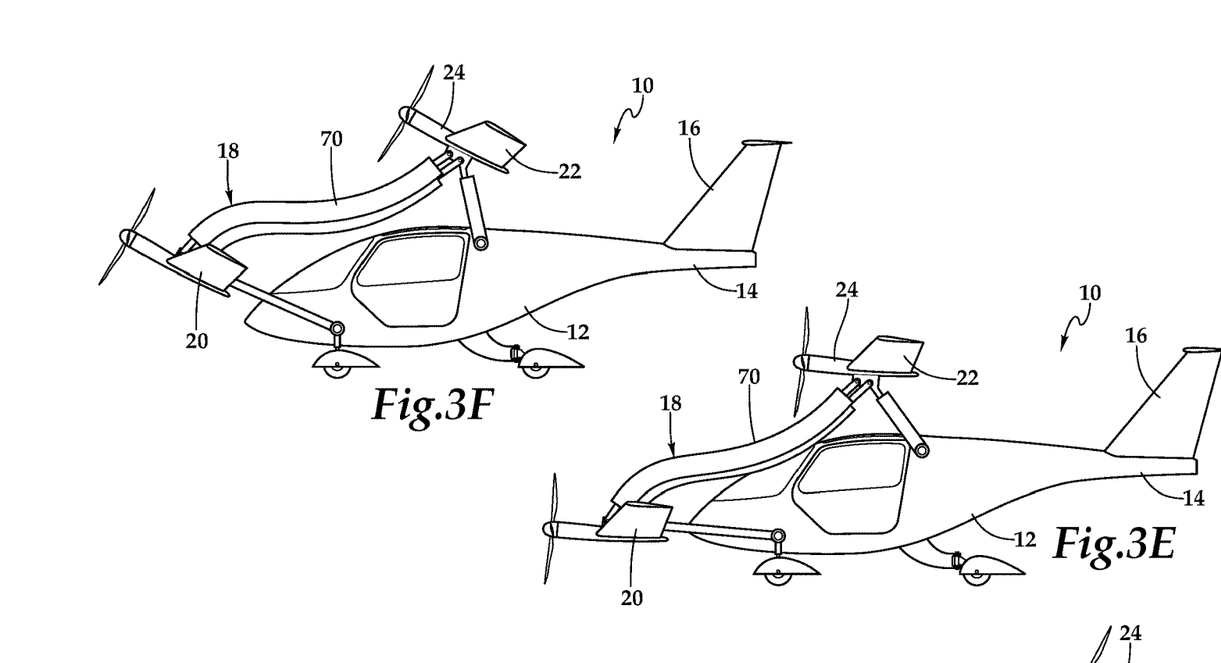

Regardless of the chosen flight control mode, each of the propulsion assemblies is independently controllable during flight operations. For example, as best seen in FIG. 3B, to aid in stabilization during VTOL operations including pitch, roll and yaw control during hover, it may be desirable to adjust the thrust output, torque output and/or thrust vector of one or more of propulsion assemblies 24 as discussed herein. After vertical assent to the desired elevation, aircraft 10 may begin the transition from vertical takeoff to forward flight. As best seen in FIGS. 3B-3E, as aircraft 10 transitions from vertical takeoff and landing flight mode to forward flight mode, dual tiltwing assembly 18 transitions from vertical lift orientation, as best seen in FIG. 3B, to forward thrust orientation, as best seen in FIG. 3E. It is noted that aircraft 10 remains in a generally horizontal attitude during this transition for the safety and comfort of passengers, crew and/or cargo carried in aircraft 10. In addition, due to the configuration of the various links of quadrilateral linkage 70 including synchronizing links 88a, 88b (see FIG. 1B), the angle of incidence of forward wing 20 remains substantially congruent with the angle of incidence of aft wing 22 during the transition, as best seen in FIGS. 3C-3D. Preferably, the transition of dual tiltwing assembly 18 is controlled by flight control system 60 providing commands to a single actuator 64 rotating shaft 76 that extends between input links 74a, 74b. In other embodiments, the rotation of forward wing 20 and aft wing 22 may be independent and/or may be controlled by multiple actuators.

Once aircraft 10 has completed the transition to forward flight mode, certain of the propulsion assemblies 24 may be operated at reduced speed or shut down as the thrust requirements in forward flight mode are reduced compared to the thrust requirements of vertical takeoff and landing flight mode. For example, certain inboard propulsion assemblies 24 may be shut down in which case, the proprotor blades may be feathered and/or folded with the rotor hubs locked to prevent rotation of the proprotors, thereby reducing drag. Alternatively, the proprotor blades may be feathered with the rotor hubs unlock allowing the proprotors to windmill, thereby reducing drag.

Figures 3G, 3H:
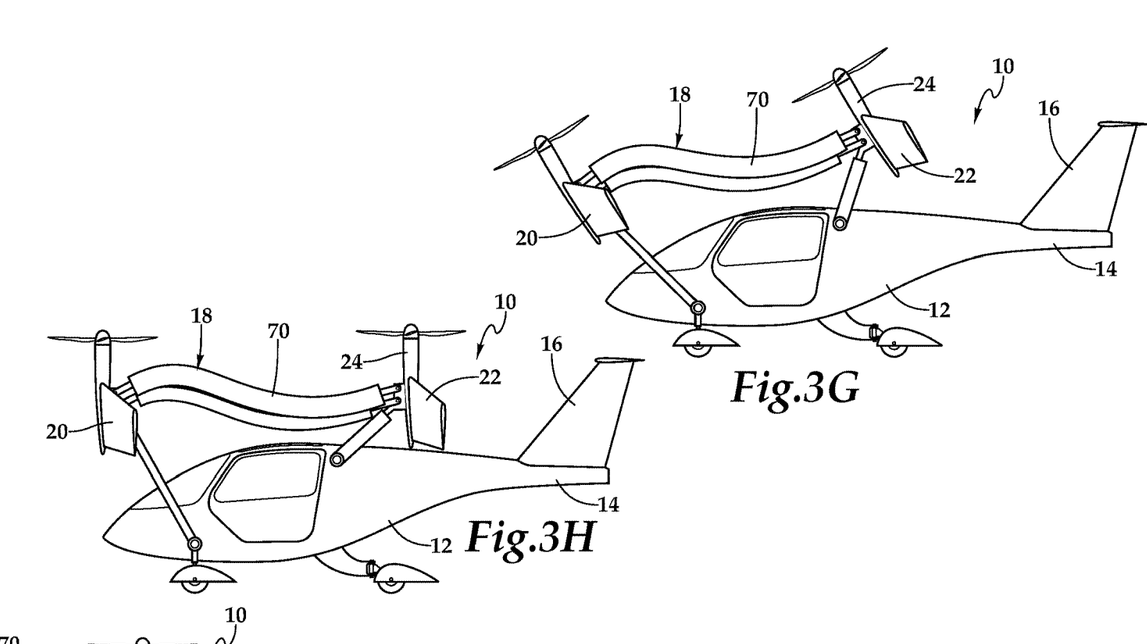

When aircraft 10 begins its approaches to the destination, any propulsion assemblies 24 that were shut down or operated at a reduced speed are reengaged to provide full propulsion capabilities. Aircraft 10 may now begin its transition from forward flight mode to vertical takeoff and landing flight mode. As best seen in FIGS. 3E-3H, dual tiltwing assembly 18 transitions from forward thrust orientation, as best seen in FIG. 3E, to vertical lift orientation, as best seen in FIG. 3H. It is noted that aircraft 10 remains in a generally horizontal attitude during this transition for the safety and comfort of passengers, crew and/or cargo carried in aircraft 10. In addition, due to the configuration of the various links of quadrilateral linkage 70 including synchronizing links 88a, 88b (see FIG. 1B), the angle of incidence of forward wing 20 remains substantially congruent with the angle of incidence of aft wing 22 during the transition, as best seen in FIGS. 3F-3G.

Figure 3I:
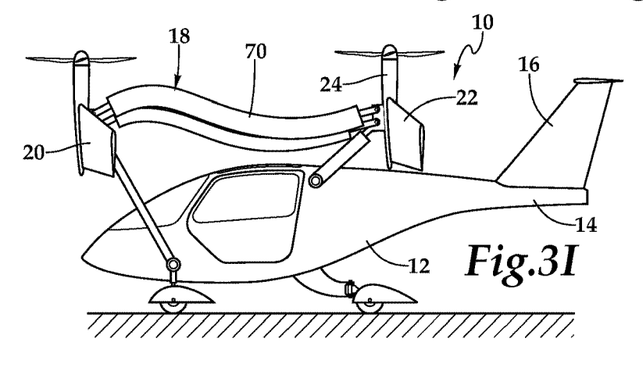

Once aircraft 10 has completed the transition to vertical takeoff and landing flight mode, as best seen in FIG. 3H, aircraft 10 may commence its vertical descent to a surface at the destination location such as the same or another airport, in a military theater, on the flight deck of an aircraft carrier or other location. As best seen in FIG. 3I, aircraft 10 has landed and is resting on the surface. Aircraft 10 may now engage in ground maneuvers, if desired.

Figure 4:
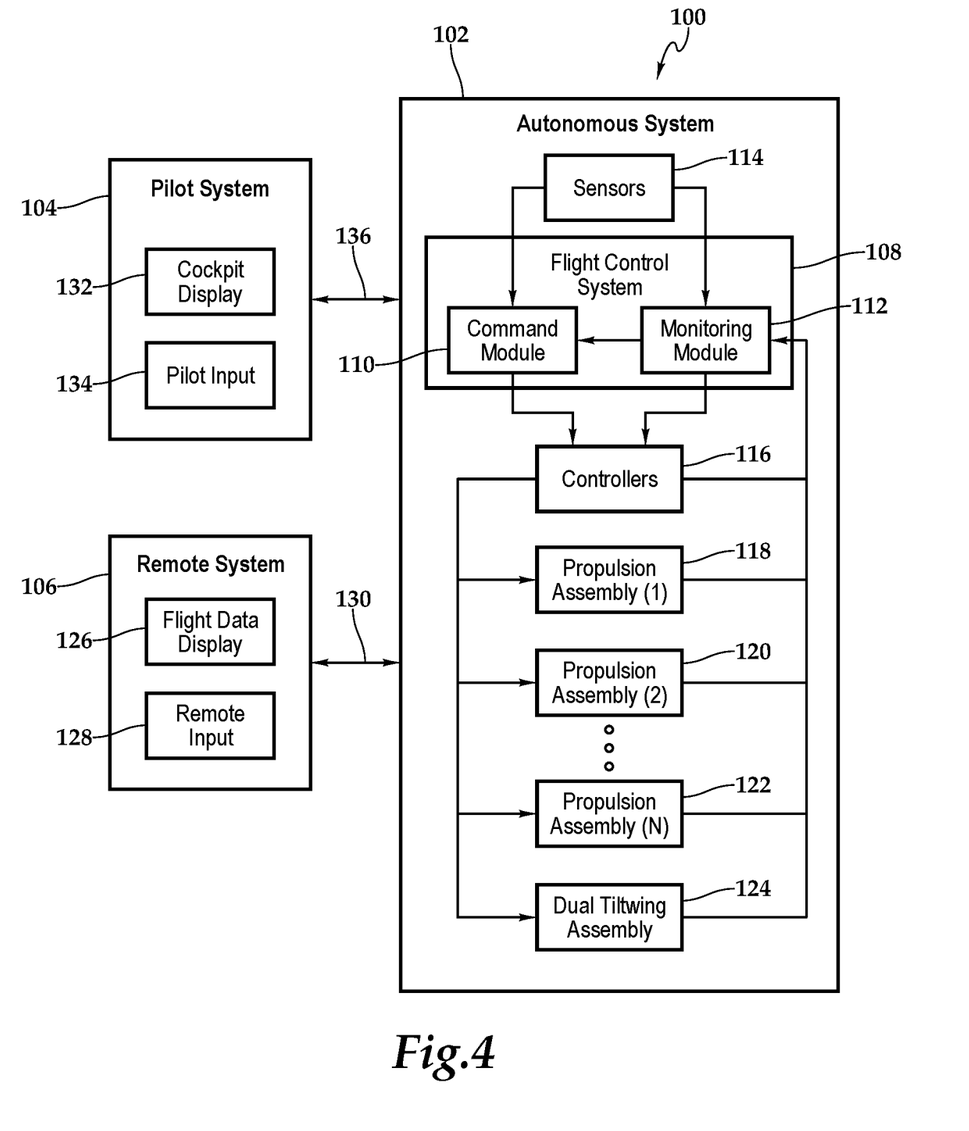
FIG. 4 is a block diagram of a control system for a dual tiltwing aircraft in accordance with embodiments of the present disclosure.

Referring additionally to FIG. 4 in the drawings, a block diagram depicts an aircraft control system 100 operable for use with aircraft 10 of the present disclosure. In the illustrated embodiment, system 100 includes three primary computer based subsystems; namely, an autonomous system 102, a pilot system 104 and a remote system 106. As discussed herein, the aircraft of the present disclosure may be operated autonomously responsive to commands generated by flight control system 108 that preferably includes a non-transitory computer readable storage medium including a set of computer instructions executable by a processor. Flight control system 108 may be a triply redundant system implemented on one or more general-purpose computers, special purpose computers or other machines with memory and processing capability. For example, flight control system 108 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 108 may be a microprocessor-based system operable to execute program code in the form of machine-executable instructions. In addition, flight control system 108 may be selectively connectable to other computer systems via a proprietary encrypted network, a public encrypted network, the Internet or other suitable communication network that may include both wired and wireless connections.

In the illustrated embodiment, flight control system 108 includes a command module 110 and a monitoring module 112. It is to be understood by those skilled in the art that these and other modules executed by flight control system 108 may be implemented in a variety of forms including hardware, software, firmware, special purpose processors and combinations thereof. Flight control system 108 receives input from a variety of sources including internal sources such as sensors 114, controllers 116, propulsion assemblies 118-122, dual tiltwing assembly 124 and pilot system 104 as well as external sources such as remote system 106, global positioning system satellites or other location positioning systems and the like. For example, flight control system 108 may receive a flight plan including starting and ending locations for a mission from pilot system 104 and/or remote system 106. Thereafter, flight control system 108 is operable to autonomously control all aspects of flight of an aircraft of the present disclosure.

For example, during the various operating modes of aircraft 10 including vertical takeoff and landing flight mode, hover flight mode, forward flight mode and transitions therebetween, command module 110 provides commands to controllers 116. These commands enable independent operation of each propulsion assembly 118-122 including, for example, controlling the rotational speed of the proprotors, changing the pitch of the proprotor blades, adjusting the thrust vectors generated by the proprotors and the like. In addition, these commands enable transition of dual tiltwing assembly 124 between the vertical lift orientation and the forward thrust orientation. Flight control system 108 receives feedback from controllers 116, each propulsion assembly 118-122 and dual tiltwing assembly 124. This feedback is processes by monitoring module 112 that can supply correction data and other information to command module 110 and/or controllers 116. Sensors 114, such as positioning sensors, attitude sensors, speed sensors, environmental sensors, fuel sensors, temperature sensors, location sensors and the like also provide information to flight control system 108 to further enhance autonomous control capabilities.

Some or all of the autonomous control capability of flight control system 108 can be augmented or supplanted by a remote flight control system 106. Remote system 106 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 106 communicates with flight control system 108 via a communication link 130 that may include both wired and wireless connections.

Remote system 106 preferably includes one or more flight data display devices 126 configured to display information relating to one or more aircraft of the present disclosure. Display devices 126 may be configured in any suitable form, including, for example, liquid crystal displays, light emitting diode displays, cathode ray tube displays or any suitable type of display. Remote system 106 may also include audio output and input devices such as a microphone, speakers and/or an audio port allowing an operator to communicate with, for example, a pilot on board aircraft 10. The display device 126 may also serve as a remote input device 128 if a touch screen display implementation is used, however, other remote input devices, such as a keyboard or joysticks, may alternatively be used to allow an operator to provide control commands to an aircraft being operated responsive to remote control.

Some or all of the autonomous and/or remote flight control of an aircraft of the present disclosure can be augmented or supplanted by onboard pilot flight control from pilot system 104. Pilot system 104 may be integrated with autonomous system 102 or may be a standalone system preferably including a non-transitory computer readable storage medium including a set of computer instructions executable by a processor and may be implemented by a general-purpose computer, a special purpose computer or other machine with memory and processing capability. Pilot system 104 may include one or more memory storage modules including, but is not limited to, internal storage memory such as random access memory, non-volatile memory such as read only memory, removable memory such as magnetic storage memory, optical storage memory, solid-state storage memory or other suitable memory storage entity. Pilot system 104 may be a microprocessor-based system operable to execute program code in the form of machine-executable instructions. In addition, pilot system 104 may be connectable to other computer systems via a proprietary encrypted network, a public encrypted network, the Internet or other suitable communication network that may include both wired and wireless connections. Pilot system 104 may communicate with flight control system 108 via a communication channel 136 that preferably includes a wired connection.

Pilot system 104 preferably includes a cockpit display device 132 configured to display information to an onboard pilot. Cockpit display device 132 may be configured in any suitable form, including, for example, as one or more display screens such as liquid crystal displays, light emitting diode displays and the like or any other suitable display type including, for example, a display panel, a dashboard display, an augmented reality display or the like. Pilot system 104 may also include audio output and input devices such as a microphone, speakers and/or an audio port allowing an onboard pilot to communicate with, for example, air traffic control or an operator of a remote system. Cockpit display device 132 may also serve as a pilot input device 134 if a touch screen display implementation is used, however, other user interface devices may alternatively be used to allow an onboard pilot to provide control commands to an aircraft being operated responsive to onboard pilot control including, for example, a control panel, mechanical control devices or other control devices. As should be apparent to those having ordinarily skill in the art, through the use of system 100, an aircraft of the present disclosure can be operated responsive to a flight control protocol including autonomous flight control, remote flight control or onboard pilot flight control and combinations thereof.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft having a vertical takeoff and landing flight mode and a forward flight mode, the aircraft comprising:
   a fuselage;
   a dual tiltwing assembly having a vertical lift orientation and a forward thrust orientation relative to the fuselage, the dual tiltwing assembly including a forward wing, an aft wing and a planar quadrilateral linkage having four revolute joints, the quadrilateral linkage rotatably coupling the forward wing to the aft wing, the aft wing to the fuselage and the fuselage to the forward wing at the revolute joints;
   a distributed propulsion system coupled to the dual tiltwing assembly, the distributed propulsion system including a plurality of forward propulsion assemblies coupled to the forward wing and a plurality of aft propulsion assemblies coupled to the aft wing; and
   a flight control system operably associated with the distributed propulsion system and the dual tiltwing assembly, the flight control system operable to transition the dual tiltwing assembly between the vertical lift orientation and the forward thrust orientation.

2. The aircraft as recited in claim 1 wherein propwash generated by the forward propulsion assemblies travels substantially in the chordwise direction of the forward wing and propwash generated by the aft propulsion assemblies travels substantially in the chordwise direction of the aft wing in both the vertical lift orientation and the forward thrust orientation of the dual tiltwing assembly.

3. The aircraft as recited in claim 1 wherein the forward wing maintains a substantially congruent angle of incidence with the aft wing during transitions between the vertical lift orientation and the forward thrust orientation of the dual tiltwing assembly.

4. The aircraft as recited in claim 1 wherein the quadrilateral linkage further comprises a convex quadrilateral linkage.

5. The aircraft as recited in claim 1 wherein the quadrilateral linkage further comprises a non-Grashof quadrilateral linkage.

6. The aircraft as recited in claim 1 wherein each of the propulsion assemblies further comprises:
   a nacelle operable to be coupled to one of the forward and aft wings;
   an electric motor disposed within the nacelle;
   a rotor hub mechanically coupled to the electric motor and operable to rotate responsive to operation of the electric motor; and
   a proprotor mechanically coupled to the rotor hub and operable to rotate therewith.

7. The aircraft as recited in claim 1 further comprising an electrical energy source disposed within the fuselage operable to provide electrical energy to each of the propulsion assemblies.

8. The aircraft as recited in claim 1 further comprising an electrical energy generation system disposed within the fuselage operable to provide electrical energy to each of the propulsion assemblies, the electrical energy generation system including at least one internal combustion engine and an electric generator.

9. The aircraft as recited in claim 1 wherein the flight control system commands operation of the propulsion assemblies and the dual tiltwing assembly responsive to at least one of onboard pilot flight control, remote flight control, autonomous flight control and combinations thereof.

10. The aircraft as recited in claim 1 wherein the quadrilateral linkage further comprises:
    a fixed link formed by the fuselage;
    first and second input links coupled between the fixed link and one of the forward and aft wings;
    a rotatable shaft coupling the first and second input links;
    first and second floating links coupled between the forward wing and the aft wing; and
    first and second output links coupled between the fixed link and the other of the forward and aft wings.

11. The aircraft as recited in claim 10 further comprising first and second synchronizing links coupled between the forward wing and the aft wing to maintain an angle of incidence of the forward wing substantially congruent with an angle of incidence of the aft wing during transitions between the vertical lift orientation and the forward thrust orientation of the dual tiltwing assembly.

12. The aircraft as recited in claim 1 wherein the quadrilateral linkage further comprises:
   a fixed link formed by the fuselage;
   an input link coupled between the fixed link and one of the forward and aft wings;
   a floating link coupled between the forward wing and the aft wing; and
   an output link coupled between the fixed link and the other of the forward and aft wings.

13. The aircraft as recited in claim 12 further comprising a synchronizing link coupled between the forward wing and the aft wing to maintain an angle of incidence of the forward wing substantially congruent with an angle of incidence of the aft wing during transitions between the vertical lift orientation and the forward thrust orientation of the dual tiltwing assembly.

14. The aircraft as recited in claim 12 further comprising a rotary actuator operably disposed between the flight control system and the input link and operable to transition the dual tiltwing assembly between the vertical lift orientation and the forward thrust orientation.

15. An aircraft having a vertical takeoff and landing flight mode and a forward flight mode, the aircraft comprising:
   a fuselage;
   a dual tiltwing assembly having a vertical lift orientation and a forward thrust orientation relative to the fuselage, the dual tiltwing assembly including a forward wing, an aft wing and a planar quadrilateral linkage having four revolute joints, the quadrilateral linkage rotatably coupling the forward wing to the aft wing, the aft wing to the fuselage and the fuselage to the forward wing at the revolute joints;
   a distributed propulsion system coupled to the dual tiltwing assembly, the distributed propulsion system including a plurality of forward propulsion assemblies coupled to the forward wing and a plurality of aft propulsion assemblies coupled to the aft wing; and
   a flight control system operably associated with the distributed propulsion system and the dual tiltwing assembly, the flight control system operable to transition the dual tiltwing assembly between the vertical lift orientation and the forward thrust orientation;
   wherein, the quadrilateral linkage includes a first link formed by the fuselage, a second link coupled between the first link and the forward wing, a third link coupled between the forward wing and the aft wing and a fourth link coupled between the aft wing and the first link.

16. The aircraft as recited in claim 15 further comprising a synchronizing link coupled between the forward wing and the aft wing operable to maintain an angle of incidence of the forward wing substantially congruent with an angle of incidence of the aft wing during transitions between the vertical lift orientation and the forward thrust orientation of the dual tiltwing assembly.

17. The aircraft as recited in claim 15 further comprising a rotary actuator operably disposed between the flight control system and the quadrilateral linkage, the rotary actuator configured to transition the dual tiltwing assembly between the vertical lift orientation and the forward thrust orientation.

18. The aircraft as recited in claim 15 wherein each of the propulsion assemblies further comprises:
   a nacelle coupled to one of the forward and aft wings;
   an electric motor disposed within the nacelle;
   a rotor hub mechanically coupled to the electric motor and operable to rotate responsive to operation of the electric motor; and
   a proprotor mechanically coupled to the rotor hub and operable to rotate therewith.

19. The aircraft as recited in claim 15 further comprising an electrical energy generation system disposed within the fuselage operable to provide electrical energy to each of the propulsion assemblies, the electrical energy generation system including at least one internal combustion engine and an electric generator.

20. The aircraft as recited in claim 15 wherein the flight control system commands operation of the propulsion assemblies responsive to at least one of onboard pilot flight control, remote flight control, autonomous flight control and combinations thereof.

\* \* \* \* \*